No. 770,064. Patented September 13, 1904.

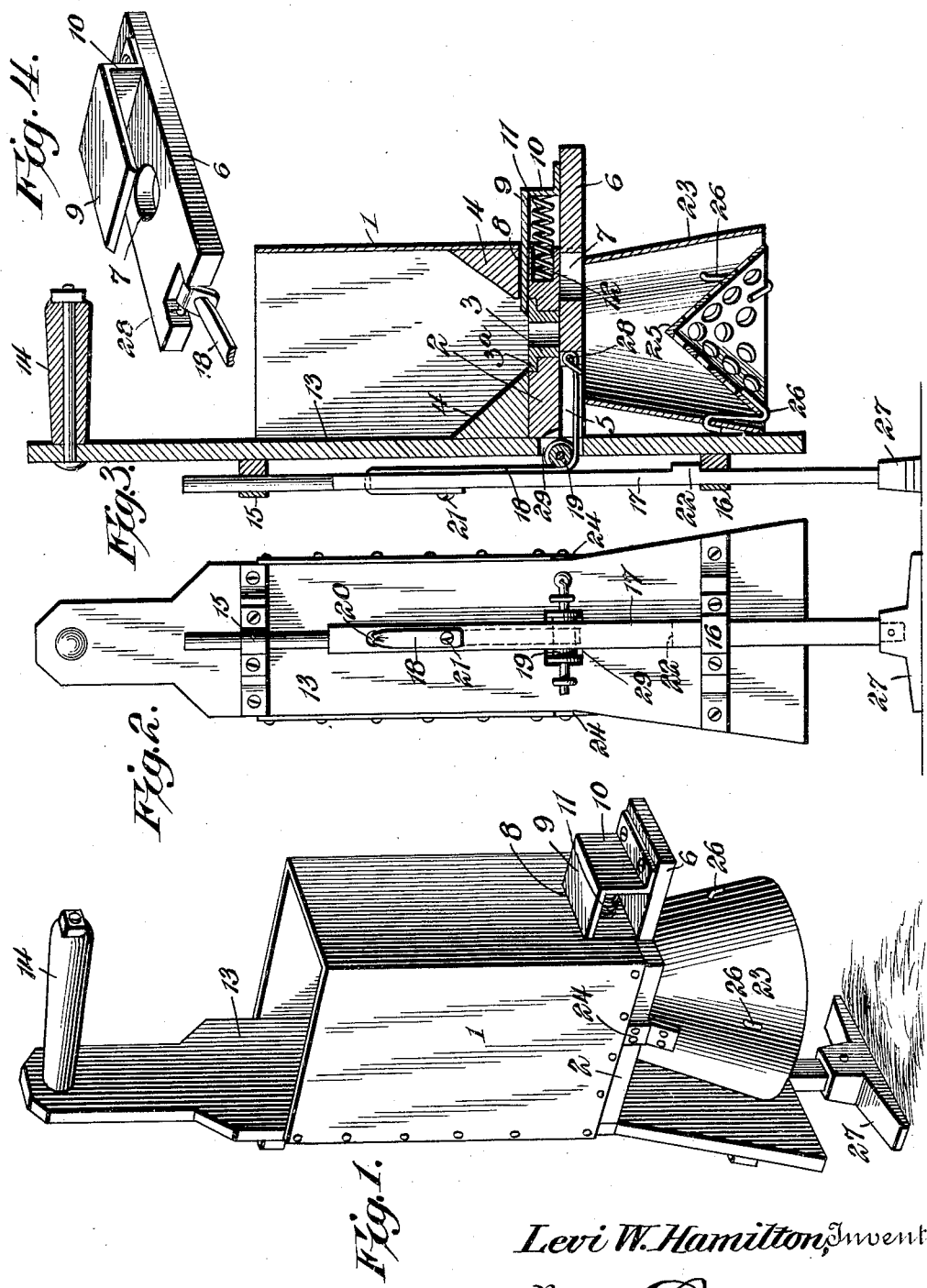

UNITED STATES PATENT OFFICE.

LEVI WOOLFORD HAMILTON, OF GUTHRIE, KENTUCKY, ASSIGNOR OF ONE-HALF TO BRANCH A. WHITE, OF GUTHRIE, KENTUCKY.

FERTILIZER-DISTRIBUTER.

SPECIFICATION forming part of Letters Patent No. 770,064, dated September 13, 1904.

Application filed March 24, 1904. Serial No. 199,740. (No model.)

*To all whom it may concern:*

Be it known that I, LEVI WOOLFORD HAMILTON, a citizen of the United States, residing at Guthrie, in the county of Todd and State of Kentucky, have invented a new and useful Fertilizer-Distributer, of which the following is a specification.

The invention relates to improvements in fertilizer-distributers.

The object of the present invention is to improve the construction of fertilizer-distributers and to provide a simple and comparatively inexpensive one which will be light, strong, and durable and which will be adapted to be carried about by hand.

A further object of the invention is to provide a hand fertilizer-distributer of this character adapted to be readily operated and capable of scattering the fertilizer over the ground.

Another object of the invention is to enable the quantity of fertilizer discharged at each operation of the device to be readily controlled.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of the fertilizer-distributer constructed in accordance with this invention. Fig. 2 is a rear elevation of the same. Fig. 3 is a vertical sectional view. Fig. 4 is a detail perspective view of the slide and the cut-off.

Like numerals of reference designate corresponding parts in all the figures of the drawings.

1 designates a hopper or receptacle for the fertilizer, interiorly tapered at the lower portion and provided with a bottom 2, having a central discharge-opening in which is arranged a removable collar or sleeve 3, adapted to be removed to vary the size of the discharge-opening. This may be effected by employing collars or sleeves having apertures of different sizes and by omitting the collar or sleeve. The collar or sleeve is provided at its upper end with a projecting annular flange $3^a$, which fits in a corresponding recess of the bottom, whereby the collar or sleeve is prevented from falling through the opening of the bottom. The hopper may be constructed in any desired manner, and, as illustrated in Fig. 3 of the drawings, the taper of the lower portion may be formed by opposite triangular blocks 4. The bottom is provided with a recess 5, in which is arranged a slide 6, having an aperture 7, adapted when the slide is moved inward to register with the discharge-opening of the bottom of the hopper for discharging a quantity of fertilizer. The hopper is slotted at 8 at its front at the upper face of the bottom to provide an opening or way for a cut-off 9, consisting of a plate beveled at its inner end and arranged to cover the discharge-opening of the bottom when the opening of the slide registers with the same, whereby the fertilizer will be prevented from falling freely through the bottom. By this construction charges of a predetermined quantity are delivered at each operation of the device. The plate 9 is provided at its outer end with an L-shaped arm or portion 10, which is secured to the outer portion of the upper face of the slides 6, whereby the cut-off is connected with the latter. The L-shaped or angularly-bent portion of the plate also forms a bearing for a coiled spring 11, which is adapted to force the slide outward when the same is free to move. The inner end of the spring is seated in a socket 12 of the outer portion of the bottom and is interposed between the same and the angularly-bent portion or arm of the cut-off. The rear wall 13 of the hopper is preferably extended above and below the same, the upper portion being provided with a handle 14. The back is provided with upper and lower guides 15 and 16, in which is arranged a bar 17, which is connected with the slide 6 by a flexible connection 18. The flexible connection preferably consists of a strap secured at its lower or outer end to the rear end of the slide and passing under an antifriction-roller 19 and extending upward therefrom to the operating-bar. The rear end of the slide is recessed or bifurcated and is provided with a pin 28, around which the front or outer end of the flexible connection is placed. The front end of the flexible connection is preferably provided with an aperture through which the body portion of the flexible connection is passed to form a loop for engaging the pin 28. The antifriction device, which is grooved, as shown, is mounted in an opening 29 of the lower extended portion of the back of the hopper. The operating-bar is provided with an opening 20, through which the flexible connection extends, and the upper or rear end of the flexible connection is secured to the outer or rear face of the operating-bar by means of a screw 21 or other suitable fastening device. The upper portion of the operating-bar is rounded, as shown, and the upper guide is provided with an opening conforming to the configuration of the rounded portion. The lower guide is provided with a rectangular opening to fit the lower portion of the operating-bar. These guides preferably consist of metal straps secured to cleats, as shown; but they may be constructed in any other desired manner. The operating-bar is provided with a suitable stop 22, arranged to engage the lower guide, as shown in Fig. 3, to limit the outward movement of the slide.

The fertilizer-distributer is provided with a discharge-spout 23, consisting of a slightly-tapered approximately cylindrical casing and secured to the bottom of the hopper at opposite sides thereof by means of straps or pieces 24. Within the spout is arranged a conical spreader 25, consisting of a cone secured to the spout by hooks 26 and provided with openings through which the fertilizer passes. The spreading or scattering device is spaced from the lower end of the spout to provide an annular discharge-opening, and it will be apparent that when the fertilizer is discharged it will be spread over the ground. The hooks may consist of stout wires extending upward from the base of the conical spreader and suitably secured to the same. The spout is provided with openings to receive the hooks.

The operating-bar is provided at its lower end with a foot-piece 27, having a socket to receive the lower reduced end of the operating-bar and suitably secured to the same. The foot prevents the operating-bar from sinking into the soil. The fertilizer-distributer is operated by placing the operating-bar on the ground and pressing downward. This will move the slide inward, and as soon as the device is relieved of pressure the spring will force the slide outward.

Having thus fully described my invention, what I claim as new, and desire to secure by Letters Patent, is—

1. A device of the class described, comprising a hopper provided with a bottom opening, and having a socket at the outer edge of the bottom, a slide having an opening to register with the bottom, a cut-off arranged to cover the opening of the bottom, and having an arm connected with the slide and located opposite the said socket, a coiled spring housed between the cut-off and the slide and fitted in the socket and engaging the arm of the cut-off for moving the slide in one direction, and means for moving the slide in the opposite direction, substantially as described.

2. A device of the class described, comprising a hopper provided with a bottom opening, a slide operating beneath the hopper and having an opening, a cut-off operating above the bottom and arranged to cover the opening thereof and connected at its outer end with a slide, a spring arranged at the outer end of the slide and located between the same and the cut-off and adapted to move the slide in one direction, an operating-bar located at the other end of the slide, and a flexible connection extending from the bar to the slide, substantially as described.

3. A device of the class described, provided with a discharge-spout, a substantially conical spreader located within the lower portion of the discharge-spout and spaced from the walls thereof and provided with openings, and means for detachably mounting the spreader within the spout, substantially as described.

4. A device of the class described, having a spout provided with apertures, and a conical spreader provided with openings, and having hooks for engaging the said apertures, substantially as described.

In testimony that I claim the foregoing as my own I have hereunto affixed my signature in the presence of two witnesses.

LEVI WOOLFORD HAMILTON.

Witnesses:
R. L. BURRUS,
GILLEY DAVIS.